United States Patent
Lin et al.

(10) Patent No.: US 8,774,145 B2
(45) Date of Patent: Jul. 8, 2014

(54) TECHNIQUES TO DETERMINE USER PRESENCE

(75) Inventors: Xintian E. Lin, Palo Alto, CA (US); Qinghua Li, San Ramon, CA (US); Songnan Yang, San Jose, CA (US); Jie Gao, Sunnyvale, CA (US); Yongfang Guo, Sunnyvale, CA (US); Ulun Karacaoglu, San Diego, CA (US); Kristoffer D. Fleming, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 417 days.

(21) Appl. No.: 13/078,354

(22) Filed: Apr. 1, 2011

(65) Prior Publication Data

US 2012/0250539 A1    Oct. 4, 2012

(51) Int. Cl.
*H04W 4/00* (2009.01)
*H04B 17/00* (2006.01)
*H04L 29/08* (2006.01)
*H04W 4/20* (2009.01)
*H04W 52/28* (2009.01)

(52) U.S. Cl.
CPC .......... *H04B 17/0072* (2013.01); *Y02B 60/50* (2013.01); *H04L 67/24* (2013.01); *H04W 52/283* (2013.01); *H04W 4/206* (2013.01)
USPC .......................... 370/338; 370/401; 455/456.1

(58) Field of Classification Search
None
See application file for complete search history.

(56) References Cited

U.S. PATENT DOCUMENTS

| 8,089,405 | B2 * | 1/2012 | Piersol et al. | 342/386 |
| 8,265,652 | B2 * | 9/2012 | Piersol et al. | 455/456.1 |
| 8,369,291 | B2 * | 2/2013 | Liebsch | 370/338 |
| 8,619,704 | B2 * | 12/2013 | Kim et al. | 370/331 |
| 2004/0176024 | A1 * | 9/2004 | Hsu et al. | 455/3.04 |
| 2005/0222933 | A1 | 10/2005 | Wesby | |
| 2006/0046709 | A1 * | 3/2006 | Krumm et al. | 455/422.1 |
| 2006/0221927 | A1 * | 10/2006 | Yamada et al. | 370/345 |
| 2009/0085806 | A1 * | 4/2009 | Piersol et al. | 342/386 |
| 2009/0088182 | A1 * | 4/2009 | Piersol et al. | 455/456.1 |

(Continued)

FOREIGN PATENT DOCUMENTS

| EP | 2073098 A2 | 6/2009 |
| JP | 2001-268655 A | 9/2001 |

(Continued)

OTHER PUBLICATIONS

International Search Report and Written Opinion Received for PCT Application No. PCT/US2012/031088, mailed on Oct. 25, 2012, 14 Pages.

(Continued)

*Primary Examiner* — Bob Phunkulh
(74) *Attorney, Agent, or Firm* — Ellis B. Ramirez; Prass LLP

(57) ABSTRACT

An embodiment of the present invention provides a method of detecting user presence, comprising registering a client associated with the user on a host associated with the user and setting up a wireless communication pairing, wherein while setting up the pairing, the client measures the host wireless communication power and uses it as calibration threshold for distance detection, and wherein the client measures a beacon power of the host radio and when the beacon power is above a threshold, the client is determined to be proximate to the host.

34 Claims, 1 Drawing Sheet

(56) References Cited

U.S. PATENT DOCUMENTS

| | | | |
|---|---|---|---|
| 2009/0088183 A1* | 4/2009 | Piersol et al. | 455/456.1 |
| 2009/0097428 A1* | 4/2009 | Kneckt et al. | 370/311 |
| 2009/0103503 A1* | 4/2009 | Chhabra | 370/338 |
| 2009/0247241 A1 | 10/2009 | Gollnick et al. | |
| 2010/0080134 A1 | 4/2010 | Maniatopoulos et al. | |
| 2010/0157960 A1* | 6/2010 | Banerjee et al. | 370/338 |
| 2010/0189021 A1* | 7/2010 | He et al. | 370/311 |
| 2010/0245886 A1* | 9/2010 | Okajima et al. | 358/1.15 |
| 2010/0265864 A1* | 10/2010 | He et al. | 370/311 |
| 2010/0296495 A1* | 11/2010 | Iino et al. | 370/338 |
| 2010/0329207 A1* | 12/2010 | Balasubramanian | 370/331 |
| 2011/0059779 A1* | 3/2011 | Thomas et al. | 455/574 |
| 2011/0313849 A1* | 12/2011 | Brueck et al. | 705/14.45 |
| 2012/0164948 A1* | 6/2012 | Narasimha et al. | 455/63.1 |
| 2013/0229928 A1* | 9/2013 | Lipman et al. | 370/252 |

FOREIGN PATENT DOCUMENTS

| | | | |
|---|---|---|---|
| JP | 2004-289208 A | 10/2004 | |
| JP | 2007-329570 A | 12/2007 | |
| JP | 2008-205548 A | 9/2008 | |
| JP | 2009-097233 A | 5/2009 | |
| JP | 2009-148338 A | 7/2009 | |
| JP | 2010-206677 A | 9/2010 | |
| WO | 2012/135424 A2 | 10/2012 | |
| WO | 2012/135424 A3 | 12/2012 | |

OTHER PUBLICATIONS

Office Action Received for Japanese Patent Application No. 2012-079702, mailed on May 28, 2013, 5 pages of Office Action and 5 pages of English Translation.

International Preliminary Report on Patentability and Written Opinion received for PCT Patent Application No. PCT/US2012/031088, mailed on Oct. 10, 2013, 6 pages.

Office Action received for Japanese Patent Application No. 2012-079702, mailed on Jan. 28, 2014, 8 pages of Office Action including 4 pages of English Translation.

* cited by examiner

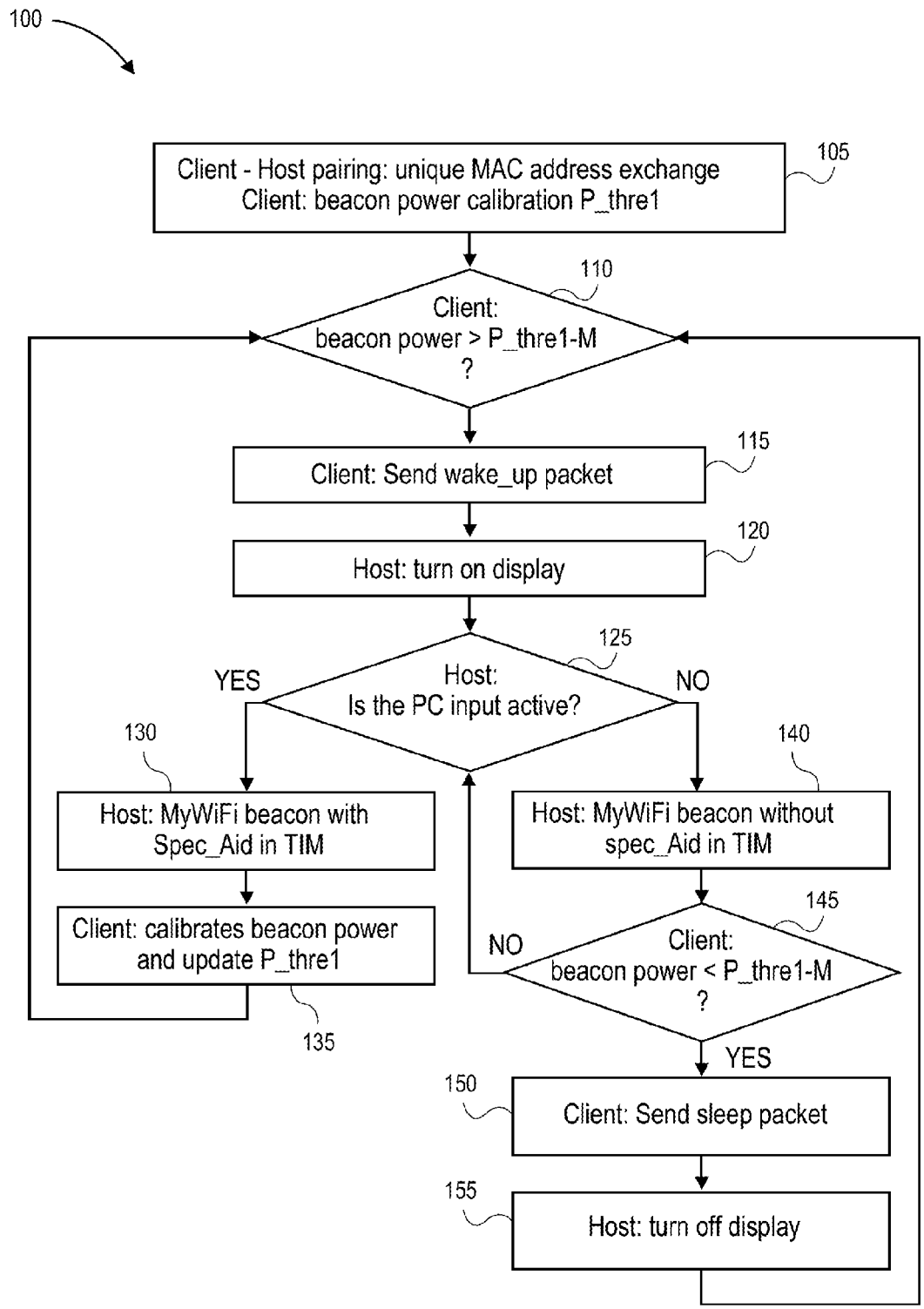

TECHNIQUES TO DETERMINE USER PRESENCE

BACKGROUND

Wireless networks have grown increasingly in importance and have varying uses; as have mobile devices, personal computers and many other devices that utilize these networks. Determining the proximity of one thing to another is an important and challenging undertaking. But it is a concept and function that has many benefits. For example, the display on a personal computer (PC) has the highest power consumption of an idling PC system. It typically runs between 30-50 percent of the total system idle power. Aggressively turning off the display power can significantly increase the battery life of the system. The current approach is a user's customized timer threshold to turn off the display when the system is not receiving any input (keyboard or mouse). The timer is typically between 1 to 10 minutes. The low-end setting is annoying when viewing documents and high-end setting reduces power saving opportunity. Determining if a user was in proximity to the computer and therefore using the computer would be a vast improvement.

Thus, a strong need exists for techniques to determine user presence.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 illustrates a process diagram according to one embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

An algorithm, technique or process is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a non-volatile storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EE-PROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below.

In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

It should be understood that embodiments of the present invention may be used in a variety of applications. Although the present invention is not limited in this respect, the devices disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's), wireless local area networks (WLAN), personal area networks (PAN, and the like), wireless wide are networks (WWAN), wireless metropolitan area networks (WMAN) and Mesh networks.

Embodiments of the present invention may refer to mobile devices. A mobile device (also known as a handheld device, handheld computer or simply handheld) may be a pocket-sized computing device, typically having a display screen with touch input and/or a miniature keyboard. In the case of the personal digital assistant (PDA) the input and output are often combined into a touch-screen interface. PDAs are popular amongst those who require the assistance and convenience of certain aspects of a conventional computer, in environments where carrying one would not be practical. Enterprise digital assistants can further extend the available functionality for the business user by offering integrated data capture devices like barcode, RFID and smart card readers.

Although not limited in this respect, one type of such mobile device is a Smartphone. A smartphone may be defined as device that lets you make telephone calls, but also adds features that you might find on a personal digital assistant or a computer. A smartphone also offers the ability to send and receive e-mail and edit Office documents, for example. Other types of mobile devices may be mobile information devices (MIDs).

Another mobile device may be referred to as a tablet computer. A tablet computer, or simply tablet, is a complete personal mobile computer, larger than a mobile phone or personal digital assistant, integrated into a flat touch screen and primarily operated by touching the screen. It often uses an onscreen virtual keyboard or a digital pen rather than a physical keyboard.

The term may also apply to a "convertible" notebook computer whose keyboard is attached to the touchscreen by a swivel joint or slide joint so that the screen may lie with its back upon the keyboard, covering it and exposing only the screen for touch operation.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g. as in a cause and effect relationship).

Embodiments of the present invention may provide using a MyWiFi mode on a host PC and WiFi radio on a smartphone to detect user presence. MyWiFi technology uses an extensible software architecture that allows the operating system to think the notebook has two Wi-Fi radios performing similar, but different, functions. Each virtual Wi-Fi radio is assigned a TCP/IP stack. MyWiFi Technology communicates to an Institute for Electronic and Electrical Engineers (IEEE) standards-based 802.11 Wi-Fi devices, enabling most of the base functionality of the wireless local area network (WLAN) and Wi-Fi Personal Area Network (PAN) driver to be shared.

Embodiments of the present invention may provide techniques for proximity detection and determination by measuring the power of the beacon packet with calibrations to improve the accuracy. Using an 802.11 beacon power with presence calibration is a low cost and low power solution for a host, such as a personal computer.

Applications of such proximity detection may include enabling determining which computer monitors or computers themselves should be put to sleep and wake up. The present invention provides a low power user presence detection mechanism and with it an efficient way to turn on/off the display. Embodiments of the present invention may utilize the WiFi radio and MyWiFi mode on the PC system (host) and the WiFi radio on a mobile device, such as, but not limited to, a smartphone (also may be referred to herein as a Client) carried by the user.

First, the user registers the client on the host by setting up the pairing. While setting up pairing, the client measures the host WiFi power and uses it as calibration threshold for distance detection. In normal operation, the client measures the beacon power of the host WiFi radio in MyWiFi mode. When the power is above the threshold, the client sends a wake up packet to the host to turn on the display. Anytime the PC system senses input on keyboard and mouse, the beacon packets indicate that by inserting a Pre-agreed Aid (Association id) in the traffic indication map (TIM) field. Therefore the client can always use the power of the beacon packet to calibrate the power threshold.

When the user moves away from the PC, the beacon power received by the client will decrease. When the client receives beacon packet without the Pre-agreed Aid in the TIM field and beacon power is lower than a threshold, Client sends a sleep packet to the host to turn off the display.

Turning now to FIG. 1, shown generally as 100 is process diagram according to embodiments of the present invention. At 105 Client—Host pairing occurs with a unique MAC address exchange and calibration P_thre1. At 110 the client determines if beacon power is greater than a predetermined amount P_thre1-M (where M is a threshold triggering value such as a percentage of the host WiFi power, or an arbitrary power level and the like; and P_thre_1 is the host WiFi power).

If yes at 110 the client sends a wake up packet 115 and the host turns on the display 120. The Host determines at 125 if the PC is active. If yes, then at 130 the host sends MyWiFi beacon with Spec_Aid in TIM and at 135 the client calibrates beacon power and updates power, P_thre1. If no at 125, at 140 the Host sends MyWiFi beacon without spec_Aid in TIM. And if, at 145 the client determines that beacon power is less than P_thre1-M, the client sends a sleep packet at 150 and at 155 the host turns off the display and returns to step 110. If no at 145, the process returns to 125.

Embodiments of the present invention may provide uses other than turning a display on and off based on proximity and considers other uses of the proximity determination of the present invention. The user presence sensor can be used in many other applications, such as, but not limited to, waking up host PC with wake on WLAN by proximity, aiding secure login at a distance, phone transfer depending on the user location and a generic version of longer range NFC (Near Field Communication). Also, embodiments of the present invention may be further extended to carry host information to other PC systems, like in session transfer and wireless display.

Also, it is understood that the present invention is not limited to a particular wireless technology such as 802.11 (WiFi). Other examples of wireless technologies that may be included in the present invention include 802.15 Bluetooth, Ultra Wide Band and Zigbee as well as millimeter wave (60 Ghz) technology, and other radio technologies.

Embodiments of the present invention may further provide reducing the power of packet transmissions to reduce the power consumption of the mobile device and PC, and so only nearby device can detect the beacon.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. A method of detecting user presence, comprising:
   registering a client associated with said user on a host associated with said user and setting up a wireless communication pairing, wherein while setting up said pairing, said client measures said host wireless communication beacon power and uses it as a calibration threshold for distance detection; and
   wherein said client measures a beacon power of said host and when said beacon power is above a power threshold, said client is determined to be proximate to said host;
   wherein when said user moves away from said host and said beacon power received by said client is decreased and when said client receives a beacon packet without an association Aid (Pre-agreed Aid) in a traffic indication map (TIM) field and said beacon power is lower than said power threshold, said Client sends a sleep packet to said host to turn off a display associated with said host.

2. The method of claim 1, wherein said client is a mobile device and said host is a personal computer (PC) and wherein anytime said PC senses input by said user, beacon packets transmitted from said PC to said mobile device indicate that by inserting said Pre-agreed Aid in said TIM field and therefore said client can always use said beacon power as the calibration threshold.

3. The method of claim 2, wherein when said user moves away from said PC, said beacon power received by said client will decrease and said client will receive said beacon packet without said Pre-agreed Aid in said TIM field.

4. The method of claim 3, wherein when said user moves away from said PC and said beacon power received by said client is decreased and when said client receives said beacon packet without said Pre-agreed Aid in said TIM field and beacon power is lower than said power threshold, said Client sends a sleep packet to said host to put said PC to sleep and wherein when said user is proximate to said PC, said PC is awakened using wake on WLAN by proximity.

5. The method of claim 3, further comprising using said detection of said user presence to facilitate secure login at a distance or phone transfer depending on said user location or providing a longer range NFC (Near Field Communication).

6. The method of claim 5, further comprising using said detection of said user presence to facilitate carrying host information to other PC systems.

7. The method of claim 2, wherein said wireless communication is according to the Institute for Electronic and Electrical Engineering (IEEE) 802.11 standard and utilizes a WiFi radio on said mobile device carried by said user and a MyWiFi mode on said PC.

8. The method of claim 2, wherein said wireless communication is according to the Institute for Electronic and Electrical Engineering (IEEE) 802.15 standard and utilizes a Bluetooth radio on said mobile device carried by said user and a Bluetooth mode on said PC.

9. The method of claim 1, wherein said client is a smartphone.

10. An apparatus, comprising: a mobile device adapted for wireless communications with a host and setting up a wireless communication pairing between said host and said mobile client, wherein while setting up said pairing, said mobile device measures said host wireless communication beacon power and uses it as a calibration threshold for distance detection; and
    wherein said mobile device measures a beacon power of said host radio and when said beacon power is above a power threshold, said mobile device is determined to be proximate to said host;
    wherein when said user moves away from said host and said beacon power received by said client is decreased and when said client receives a beacon packet without an association Aid (Pre-agreed Aid) in a traffic indication map (TIM) field and said beacon power is lower than said power threshold, said Client sends a sleep packet to said host to turn off a display associated with said host.

11. The apparatus of claim 10, wherein said host is a personal computer (PC) and anytime said PC senses input, beacon packets transmitted from said PC to said mobile device indicate that by inserting said Pre-agreed Aid in said TIM field and therefore said mobile device always use said beacon power as the calibration threshold.

12. The apparatus of claim 11, wherein when said mobile client moves away from said PC, said beacon power received by said mobile device will decrease and said client will receive said beacon packet without said Pre-agreed Aid in said TIM field.

13. The apparatus of claim 12, wherein when said mobile client is moved away from said PC and said beacon power received by said mobile is decreased and when said mobile device receives said beacon packet without said Pre-agreed Aid in said TIM field and beacon power is lower than said power threshold, said mobile device sends a sleep packet to said host to put said PC to sleep and wherein when said mobile device is proximate to said PC, said PC is awakened using wake on WLAN by proximity.

14. The apparatus of claim 12, wherein said mobile device is further adapted to use said detection of said user presence to facilitate secure login at a distance or phone transfer depending on said mobile device location or providing a longer range NFC (Near Field Communication).

15. The apparatus of claim 14, wherein said mobile device is further adapted to use said detection of said mobile client presence to facilitate carrying host information to other PC systems.

16. The apparatus of claim 15, wherein said wireless communication is according to the Institute for Electronic and Electrical Engineering (IEEE) 802.15 standard and utilizes a Bluetooth radio on said mobile device and a Bluetooth mode on said PC.

17. The apparatus of claim 11, wherein said wireless communication is according to the Institute for Electronic and Electrical Engineering (IEEE) 802.11 standard and utilizes a WiFi radio on said mobile device carried by said user and a MyWiFi mode on said PC.

18. The apparatus of claim 10, wherein said mobile device is a smartphone.

19. An apparatus, comprising: a host adapted for wireless communication with a mobile device and capable of setting up a wireless communication pairing between said host and said mobile device, wherein while setting up said pairing, said mobile device measures said host wireless communication beacon power and uses it as a calibration threshold for distance detection, wherein the calibration threshold is a minimum beacon power at which said client is determined to be proximate to said host; and
    wherein said mobile device measures a beacon power of said host radio and when said beacon power is above a power threshold, said mobile device is determined to be proximate to said host;
    wherein when said user moves away from said host and said beacon power received by said client is decreased and when said client receives a beacon packet without an association Aid (Pre-agreed Aid) in a traffic indication map (TIM) field and said beacon power is lower than said power threshold, said Client sends a sleep packet to said host to turn off a display associated with said host.

20. The apparatus of claim 19, wherein said host is a personal computer (PC) and anytime said PC senses input, beacon packets transmitted from said PC to said mobile device indicate that by inserting said Pre-agreed Aid in said TIM field and therefore said mobile device always use said beacon power as the calibration threshold.

21. The apparatus of claim 20, wherein when said mobile client moves away from said PC, said beacon power received by said mobile device will decrease and said client will receive said beacon packet without said Pre-agreed Aid in said TIM field.

22. The apparatus of claim 21, wherein when said mobile client is moved away from said PC and said beacon power received by said mobile is decreased and when said mobile device receives said beacon packet without said Pre-agreed Aid in said TIM field and beacon power is lower than said power threshold, said mobile device sends a sleep packet to said host to put said PC to sleep and wherein when said mobile device is proximate to said PC, said PC is awakened using wake on WLAN by proximity.

23. The apparatus of claim 21, wherein said mobile device is further adapted to use said detection of said user presence to facilitate secure login at a distance or phone transfer depending on said mobile device location or providing a longer range NFC (Near Field Communication).

24. The apparatus of claim 23, wherein said mobile device is further adapted to use said detection of said mobile client presence to facilitate carrying host information to other PC systems.

25. The apparatus of claim 24, wherein said wireless communication is according to the Institute for Electronic and Electrical Engineering (IEEE) 802.15 standard and utilizes a Bluetooth radio on said mobile device and a Bluetooth mode on said PC.

26. The apparatus of claim 20, wherein said wireless communication is according to the Institute for Electronic and Electrical Engineering (IEEE) 802.11 standard and utilizes a WiFi radio on said mobile device carried by said user and a MyWiFi mode on said PC.

27. The apparatus of claim 19, wherein said mobile device is a smartphone.

28. A non-transitory machine-accessible medium that provides instructions, which when accessed, cause a machine to perform operations comprising:
   detecting user presence by registering a client associated with said user on a host associated with said user and setting up a wireless communication pairing, wherein while setting up said pairing, said client measures said host wireless communication beacon power and uses it as a calibration threshold for distance detection, wherein the calibration threshold is a minimum beacon power at which said client is determined to be proximate to said host; and wherein said client measures a beacon power of said host radio and when said beacon power is above a power threshold, said client is determined to be proximate to said host;
   wherein when said user moves away from said host and said beacon power received by said client is decreased and when said client receives a beacon packet without an association Aid (Pre-agreed Aid) in a traffic indication map (TIM) field and said beacon power is lower than said power threshold, said Client sends a sleep packet to said host to turn off a display associated with said host.

29. The non-transitory machine-accessible medium that provides instructions, which when accessed, cause a machine to perform operations of claim 28, wherein said client is a mobile device and said host is a personal computer (PC) and wherein anytime said PC senses input by said user, beacon packets transmitted from said PC to said mobile device indicate that by inserting said Pre-agreed Aid in said TIM field and therefore said client can always use said beacon power as the calibration threshold.

30. The non-transitory machine-accessible medium that provides instructions, which when accessed, cause a machine to perform operations of claim 29, wherein when said user moves away from said PC, said beacon power received by said client will decrease and said client will receive said beacon packet without said Pre-agreed Aid in said TIM field.

31. The non-transitory machine-accessible medium that provides instructions, which when accessed, cause a machine to perform operations of claim 30, wherein when said user moves away from said PC and said beacon power received by said client is decreased and when said client receives said beacon packet without said Pre-agreed Aid in said TIM field and beacon power is lower than said power threshold, said Client sends a sleep packet to said host to put said PC to sleep and wherein when said user is proximate to said PC, said PC is awakened using wake on WLAN by proximity.

32. The non-transitory machine-accessible medium that provides instructions, which when accessed, cause a machine to perform operations of claim 30, further comprising using said detection of said user presence to facilitate secure login at a distance or phone transfer depending on said user location or providing a longer range NFC (Near Field Communication).

33. The non-transitory machine-accessible medium that provides instructions, which when accessed, cause a machine to perform operations of claim 30, wherein said wireless communication is according to the Institute for Electronic and Electrical Engineering (IEEE) 802.15 standard and utilizes a Bluetooth radio on said mobile device carried by said user and a Bluetooth mode on said PC.

34. The non-transitory machine-accessible medium that provides instructions, which when accessed, cause a machine to perform operations of claim 28, wherein said wireless communication is according to the Institute for Electronic and Electrical Engineering (IEEE) 802.11 standard and utilizes a WiFi radio on said mobile device carried by said user and a MyWiFi mode on said PC.

\* \* \* \* \*